US 7,406,519 B2

(12) United States Patent
Goldick

(10) Patent No.: US 7,406,519 B2
(45) Date of Patent: Jul. 29, 2008

(54) METHOD AND SYSTEM FOR LOCKING RESOURCES IN A DISTRIBUTED ENVIRONMENT

(75) Inventor: Jonathan S. Goldick, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 09/992,644

(22) Filed: Nov. 13, 2001

(65) Prior Publication Data

US 2003/0093524 A1 May 15, 2003

(51) Int. Cl.
*G06F 15/167* (2006.01)
*G06F 15/16* (2006.01)
*G06F 15/173* (2006.01)

(52) U.S. Cl. ..................... 709/225; 709/216; 709/217
(58) Field of Classification Search ................ 709/225; 707/8, 103; 395/701, 600, 611
See application file for complete search history.

(56) References Cited

U.S. PATENT DOCUMENTS

| 5,023,907 A | 6/1991 | Johnson et al. |
| 5,117,352 A | 5/1992 | Falek ............................ 714/4 |
| 5,161,227 A | 11/1992 | Dias et al. ................... 718/104 |
| 5,175,852 A * | 12/1992 | Johnson et al. ................ 707/8 |
| 5,285,528 A | 2/1994 | Hart |
| 5,303,368 A | 4/1994 | Kotaki |
| 5,305,448 A | 4/1994 | Insalaco et al. |
| 5,367,671 A | 11/1994 | Feigenbaum et al. ........ 395/600 |
| 5,448,727 A | 9/1995 | Annevelink |
| 5,459,862 A | 10/1995 | Garliepp et al. |
| 5,485,607 A | 1/1996 | Lomet et al. ................... 707/8 |
| 5,502,840 A | 3/1996 | Barton ........................ 710/200 |
| 5,535,375 A * | 7/1996 | Eshel et al. .................. 703/27 |
| 5,555,388 A | 9/1996 | Shaughnessy |
| 5,675,782 A * | 10/1997 | Montague et al. ........... 713/201 |
| 5,682,537 A | 10/1997 | Davies et al. |
| 5,724,578 A * | 3/1998 | Morinaga et al. ........... 707/100 |
| 5,734,909 A | 3/1998 | Bennett |
| 5,745,747 A | 4/1998 | Chang et al. .................... 707/8 |

(Continued)

FOREIGN PATENT DOCUMENTS

EP 0 738 982 A2 10/1996

(Continued)

OTHER PUBLICATIONS

Groza, Voicu. "Distributed Framework for Instrumentation Hardware/Software Codesign." IEEE May 1-4, 2000, pp. 1567-1570.*

(Continued)

*Primary Examiner*—Jason Cardone
*Assistant Examiner*—Azizul Choudhury
(74) *Attorney, Agent, or Firm*—Merchant & Gould P.C.

(57) ABSTRACT

A method and system that creates and maintains lock properties for a resource or object in a distributed environment. The lock properties provide other client computer systems limited availability to the locked resource. Limited availability relates to being able to only read, write or delete the resource, or any combination thereof. Additionally, these lock properties allow other client computer systems to simultaneously hold or share equivalent locks. Other lock properties relate to advisory or mandatory status for the lock. Advisory locks may be honored or ignored by other client computer systems.

12 Claims, 5 Drawing Sheets

U.S. PATENT DOCUMENTS

| | | | |
|---|---|---|---|
| 5,832,484 | A | 11/1998 | Sankaran et al. ............... 707/8 |
| 5,835,906 | A | 11/1998 | Hagersten et al. |
| 5,862,376 | A | 1/1999 | Steele, Jr. et al. |
| 5,933,825 | A | 8/1999 | McClaughry et al. |
| 5,995,998 | A | 11/1999 | Furiani et al. |
| 6,016,490 | A | 1/2000 | Watanabe et al. |
| 6,026,401 | A * | 2/2000 | Brealey et al. ................. 707/8 |
| 6,044,217 | A * | 3/2000 | Brealey et al. .............. 717/107 |
| 6,073,177 | A | 6/2000 | Hebel et al. |
| 6,314,563 | B1 | 11/2001 | Agesen et al. |
| 6,321,238 | B1 | 11/2001 | Putzolu |
| 6,324,581 | B1 | 11/2001 | Xu et al. |
| 6,330,612 | B1 | 12/2001 | Boonie et al. |
| 6,353,828 | B1 | 3/2002 | Ganesh et al. |
| 6,389,420 | B1 | 5/2002 | Vahalia et al. |
| 6,405,274 | B1 | 6/2002 | Chan |
| 6,411,968 | B2 | 6/2002 | Bamford et al. |
| 6,412,034 | B1 | 6/2002 | Chan ......................... 710/200 |
| 6,493,746 | B1 | 12/2002 | Enjou |
| 6,493,804 | B1 | 12/2002 | Soltis et al. |
| 6,510,478 | B1 | 1/2003 | Jeffords et al. ............. 710/200 |
| 6,529,905 | B1 | 3/2003 | Bray et al. ..................... 707/8 |
| 6,549,862 | B1 | 4/2003 | Huang et al. |
| 6,618,744 | B1 | 9/2003 | Simmons et al. |
| 6,618,774 | B1 | 9/2003 | Simmons et al. |
| 6,625,698 | B2 | 9/2003 | Vartti ......................... 711/141 |
| 6,629,127 | B1 | 9/2003 | Deen et al. .................. 709/203 |
| 6,687,698 | B1 | 2/2004 | Nixon et al. |
| 6,704,767 | B1 | 3/2004 | Simmons et al. |
| 6,708,195 | B1 | 3/2004 | Borman et al. |
| 6,708,324 | B1 | 3/2004 | Solloway et al. |
| 6,748,470 | B2 | 6/2004 | Goldick ....................... 710/200 |
| 6,772,154 | B1 | 8/2004 | Daynes et al. |
| 6,801,986 | B2 | 10/2004 | Steely, Jr. et al. |
| 6,865,549 | B1 | 3/2005 | Connor |
| 6,959,337 | B2 | 10/2005 | McLaughlin et al. |
| 7,028,300 | B2 | 4/2006 | Goldick |
| 7,159,056 | B2 | 1/2007 | Goldick |
| 2002/0040469 | A1 | 4/2002 | Pramberger |
| 2002/0174305 | A1 | 11/2002 | Varttii |
| 2002/0178249 | A1 | 11/2002 | Prabakaran et al. |
| 2002/0194526 | A1 | 12/2002 | Ulrich et al. |
| 2003/0004952 | A1 | 1/2003 | Nixon et al. |
| 2003/0037223 | A1 | 2/2003 | Steely et al. |
| 2003/0105871 | A1 | 6/2003 | Goldick |
| 2003/0149666 | A1 | 8/2003 | Davies |
| 2003/0167317 | A1 | 9/2003 | Deen et al. |
| 2004/0255048 | A1 | 12/2004 | Lev Ran et al. |
| 2006/0136637 | A1 | 6/2006 | Goldick |
| 2006/0136926 | A1 | 6/2006 | Goldick |

FOREIGN PATENT DOCUMENTS

| | | |
|---|---|---|
| EP | 0 738 982 A3 | 10/1996 |
| EP | 0 986 009 A2 | 8/1999 |
| EP | 0 986 009 A3 | 8/1999 |
| WO | WO 01/37081 | 5/2001 |

OTHER PUBLICATIONS

Jones, Terry et al, "Performance of IBM General Parallel File System," May 2000, IEEE.*

"HTTP Extensions for Distributed Authority—WEBDAV" by Y. Goland, Microsoft; E. Whitehead, UC Irvine; A. Faizi, Netscape; S. Carter, Novell; and D. Jensen, Novell, Feb. 1999, Network Working Group, Request for Comments: 2518, Standards Track.

EP Search Report for EP 01 13 0444.

M. Norton, "OS/2s Extended Attributes", Technical Support, 'Online!, Jul. 1996; http://www,naspa.com/PDF/96/T9607014, pdf; 2 pages.

Russinovich, M., "Inside On-Access Virus Scanners", Windows & .Net Magazine, Sep. 1997, 3 pages.

Patent Abstracts of Japan, vol. 007, No. 138 & JP 58 052740 A; Fujitsu Ltd.; Mar. 29, 1983.

USPTO Action, dated Aug. 5, 2005, cited in U.S. Appl. No. 09/992,603 (U.S. Pat. No. 7,028,300).

USPTO Action, dated Feb. 9, 2005, cited in U.S. Appl. No. 09/992,603 (U.S. Pat. No. 7,028,300).

USPTO Action, dated Jul. 12, 2007, cited in U.S. Appl. No. 09/992,525 (U.S. Pub. No. 2003/0105871).

USPTO Action, dated Feb. 8, 2007, cited in U.S. Appl. No. 09/992,525 (U.S. Pub. No. 2003/0105871).

USPTO Action, dated Aug. 8, 2006, cited in U.S. Appl. No. 09/992,525 (U.S. Pub. No. 2003/0105871).

USPTO Action, dated Feb. 16, 2006, cited in U.S. Appl. No. 09/992,525 (U.S. Pub. No. 2003/0105871).

USPTO Action, dated Aug. 11, 2005, cited in U.S. Appl. No. 09/992,525 (U.S. Pub. No. 2003/0105871).

USPTO Action, dated Dec. 22, 2004, cited in U.S. Appl. No. 09/992,525 (U.S. Pub. No. 2003/0105871).

USPTO Action, dated Jan. 2, 2004, cited in U.S. Appl. No. 09/992,168 (U.S. Pat. No. 6,748,470).

USPTO Action, dated Jul. 17, 2003, cited in U.S. Appl. No. 09/992,168 (U.S. Pat. No. 6,748,470).

USPTO Action, dated Nov. 7, 2005, cited in U.S. Appl. No. 10/856,266 (U.S. Pat. No. 7,159,056).

USPTO Action, dated Feb. 23, 2005, cited in U.S. Appl. No. 10/856,266 (U.S. Pat. No. 7,159,056).

USPTO Requirement for Restriction/Election, dated Jan. 26, 2007, cited in U.S. Appl. No. 11/355,355 (U.S. Pub. No. 2006/0136637).

USPTO Final Suppl Action dated Sep. 25, 2007 cited in U.S. Appl. No. 09/992,525.

USPTO Action dated Oct. 29, 2007 cited in U.S. Appl. No. 11/355,355.

USPTO Action, dated Jan. 24, 2008 cited in U.S. Appl. No. 09/992,525.

* cited by examiner

METHOD AND SYSTEM FOR LOCKING RESOURCES IN A DISTRIBUTED ENVIRONMENT

TECHNICAL FIELD

This invention relates generally to distributed computing environments and particularly to availability management of resources in a distributed environment. More particularly, the present invention relates to methods of "locking" distributed environment resources to prevent inappropriate access to such resources. More particularly still, the present invention relates to locking methods that extend the WebDAV protocol.

BACKGROUND OF THE INVENTION

Distributed computer environments, such as computer networks, provide significant advantages to multiple computer clients or users. In particular, distributed environments allow multiple clients to actually share many different computer resources including both hardware and software resources. Sharing software-related resources provides many known benefits, such as the fact that only one such resource needs to be created, updated and maintained.

The Internet is one particular example of a distributed environment that provides access to a considerable number of software resources, which are available to practically any client computer system having Internet capabilities. One portion of the Internet is known as the World Wide Web which is a generally a system of Internet servers that house software related resources that are formatted in a particular manner, such as with HTML (HyperText Markup Language). The protocol for accessing these particular resources is known as the HyperText Transfer Protocol or HTTP. It should be noted however that not all Internet servers are part of the World Wide Web.

Historically, most resources on the Internet corresponded to web page files that included only static HTML code, and thus were only available for display. However, recent advances are being made in the representative functionality provided to client systems to provide more interaction between the client and server systems. For instance, clients may effectively author resources on a server system from client systems over distributed networks, including the Internet. Indeed, much time and effort has been spent on the development of a WebDAV protocol or standard, which stands for the World Wide Web Distributed Authoring and Versioning standard, referred to herein as simply "DAV." DAV provides a set of headers and methods which extend HTTP to provide capabilities for managing properties, namespace and other items from a client system in order to allow client computer systems to access server-side resources for the purpose of editing those resources. Proposed Standard RFC 2518, which is a document written by the IETF and approved by the IESG, published February 1999, describes DAV in more detail.

As part of the DAV standard, server computer systems provide various services in managing the various access requests made by clients. One particular service relates to controlling when a resource is available for use by a client. That is, DAV provides methods that allow a client to lock a resource when using that resource so that subsequent users may not access that resource during that time. This locking scheme helps prevent the "lost update" problem associated with two or more users modifying a resource simultaneously such that editions are inadvertently lost. Unfortunately however, the DAV protocol only provides two types of locks, an exclusive write lock and a shared write lock.

Although the exclusive and shared write locks are helpful in preventing the lost update problem, DAV does not support open sharing modes found in existing platforms, such as the Win32® platform. For example, if a client is not concerned with whether others edit or delete a resource it is using, but wants to prevent others from reading that resource while it is being used, the Win32® platform supports such a lock, but there is no method to support this lock function in DAV. Similarly, if a user wants to prevent others from deleting a resource, but is not concerned with whether others read a resource, the Win32® platform supports this function but there is no method to support this function in DAV.

The inability to provide these types of sharing procedures raises significant compatibility issues since many existing applications, such as word processing applications, utilize these open sharing modes. Consequently, when those applications are used over the Internet in combination with the DAV protocol, the open sharing modes are not supported. Therefore, much of the functionality is not available and may even cause errors to occur when attempting to use these unsupported methods.

Another drawback associated with the limited locking scheme relates to the fact that the locks are mandatory in the DAV protocol. That is, the DAV protocol cannot express advisory locks, which are well known in the UNIX platform. In the UNIX platform, cooperating applications can check for the presence of advisory locks that conflict with the attempted operation and honor that advisory lock, but there is no requirement to honor the lock. An application is therefore allowed to access a resource and edit that resource even when such access conflicts with an advisory lock. Although this scheme is prevalent in UNIX applications, there is no mechanism in DAV to create a lock that is advisory. Consequently, many Unix applications are incompatible with the DAV protocol.

It is with respect to these and other considerations that the present invention has been made.

SUMMARY OF THE INVENTION

The present invention solves these problems by creating and enabling the use of new shared lock types relating to shared read locks, shared write locks and shared delete locks. The method and system creates and maintains lock properties for a resource or object in a distributed environment. The lock properties provide other client computer systems limited availability to the locked resource. Limited availability relates to being able to only read, write or delete the resource, or any combination thereof. Additionally, these lock properties allow other client computer systems to simultaneously hold or share equivalent locks. Other lock properties provided by the present invention relate to advisory or mandatory status for the lock. Advisory locks may be either honored or ignored by other client computer systems.

In accordance with certain aspects, the present invention relates to a method of locking a resource wherein the method comprises the acts of receiving a request to access the resource, wherein the request originates from a requesting client computer system; creating a lock having a predetermined type, wherein the predetermined type provides availability to other client computer systems for predetermined purposes; providing a lock token related to the created lock to the requesting client computer system; and performing the requested access.

Additionally, the request to access the resource may provide an indication as to the type of access and to the type of lock to be created during the access. In such a case, prior to the act of creating a lock, the method may comprise the act of determining whether the resource is locked by another client computer system. Further the act of creating a lock only occurs if no existing lock conflicts with the type of access requested or the type of lock requested. In accordance with other aspects, the predetermined type of the lock provides other client computer systems access to the resource for the purpose of only reading, writing or deleting the resource or some combination thereof.

In accordance with other aspects, the lock may be advisory or mandatory. Mandatory locks may not be ignored such that conflicting access requests are denied. On the other hand, advisory locks may be honored or ignored, as determined by the requesting client system.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

Figure 1:
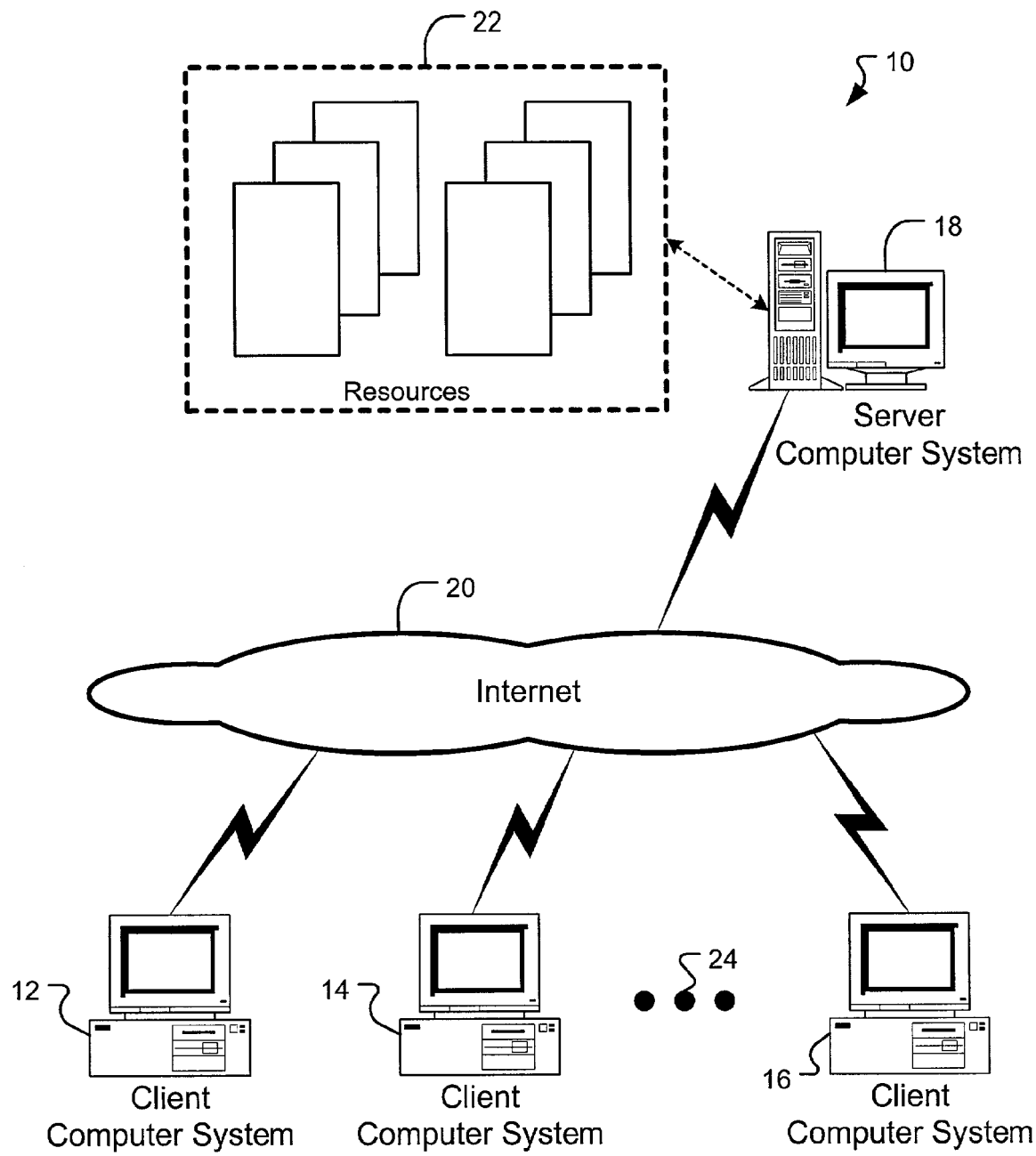
FIG. 1 is a diagram of a distributed environment having a client computer system and a server computer system that communicate according to principles of the present invention.

A distributed environment 10 incorporating aspects of the present invention is shown in FIG. 1. The environment 10 has at least one client computer system, such as client computer systems 12, 14 and 16 that interact with at least one server computer system, such as server computer system 18 over a distributed network, such as the Internet 20. The client computer systems 12, 14 and 16 request access to one or more server computer resources 22. Additionally, there may be other client computer systems as indicated by ellipses 24. The resources 22 relate to computer readable files or objects, such as text documents, application program modules, data objects, properties or attributes for data objects, among others. The resources may be HTML, XML, SGML files, or in other embodiments, the resources may be in another format.

In an embodiment of the invention, the protocol used by the systems 12, 14, 16 and 18 to communicate is the WebDAV (World Wide Web Distributed Authoring and Versioning, hereinafter "DAV") protocol. DAV is an extension of the Hypertext Transfer Protocol version 1.1 (HTTP) and provides the methods and formats for allowing client computer systems, such as computer systems 12, 14 and 16 to access and edit computer resources 22. As stated in the Background Section above, DAV also provides a set of headers and methods, which extend the HTTP to provide capabilities for property and namespace management, among other features as discussed in Proposed Standard RFC 2518.

As one client computer system, such as system 12, accesses one of the resources 22, that resource may be locked such that the other client computer systems, such as systems 14 and 16 are unable to access the resource for any purpose. In other embodiments, one or the other computer systems 14 and 16 may access the locked resource, but only for limited purposes, such as to write to the resource, read the resource or to delete the resource depending on the type of lock used on the resource by the first client computer system. In yet another embodiment, the lock may be considered advisory, such that the other client computer systems 14 and 16 may decide whether to honor the lock or to ignore the lock and access the resource accordingly.

Figure 2:
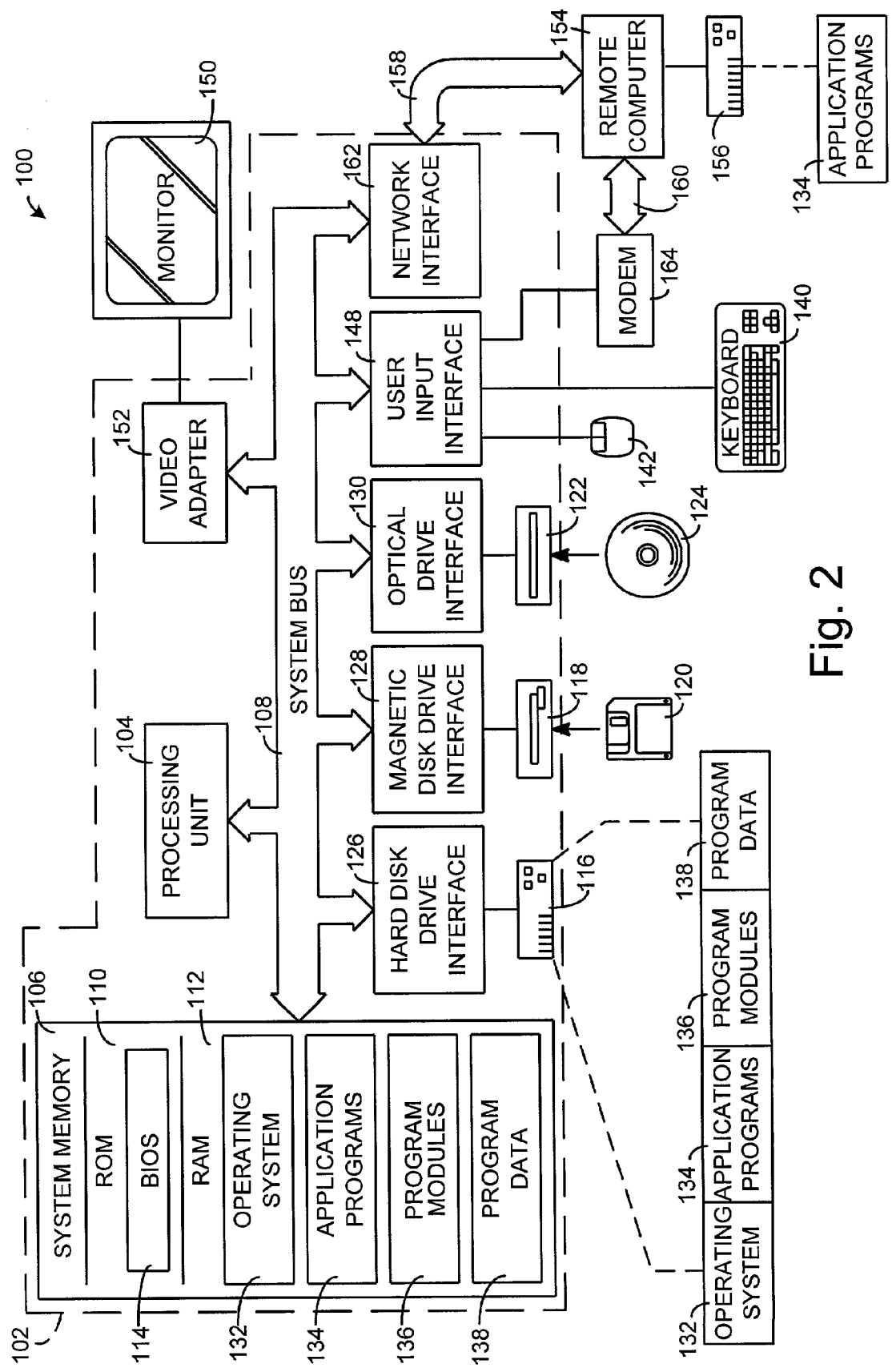
FIG. 2 is a functional diagram of a computer system that may incorporate aspects of the present invention.

FIG. 2 illustrates an example of a suitable computing system environment 100 in which aspects of the present invention may be implemented as either a client computer system such as systems 12, 14 or 16 or server computer system 18. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Environment 100 incorporates a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDE-ROM, digital versatile disks (DVD) or other optical disk storage, magnetic cassettes, magnetic tape, magnetic disk storage or other magnetic storage devices, or any other medium which can be used to store the desired information and which can be accessed by computer 102. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110, while RAM 112 typically contains files and/or program modules that are immediately accessible to and/or presently being operated on by processing unit 104. By way of example, and not limitation, FIG. 2 illustrates operating system 132, application programs 134, other program modules 136, and program data 138. Additionally, the computer 102 comprises a file system, which defines the format for the files of system 102, and further defines version-specific property formats, as discussed below.

The computer 102 may also include other removable/non-removable, volatile/nonvolatile computer storage media. By way of example only, FIG. 2 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a memory interfaces, such as interfaces 128 and 130, respectively.

The drives and their associated computer storage media discussed above and illustrated in FIG. 2, provide storage of computer readable instructions, data structures, program modules and other data for the computer 102. In FIG. 2, for example, hard disk drive 116 is illustrated as storing operating system 132, application programs 134, other program modules 136, and program data 138.

A user may enter commands and information into the computer 102 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through an input interface 148 that is coupled to the system bus 108. A monitor 150 or other type of display device may also be connected to the system bus 108 via video adapter 152. In addition to the monitor, computers may also include other peripheral output devices such as speakers and printer not shown.

The computer 102 may operate in a networked environment using logical connections to one or more remote computers, such as a remote computer 154. The remote computer 154 may be a personal computer, a server, a router, a network PC, a peer device or other common network node, and typically includes many or all of the elements described above relative to the computer 102.

When used in a LAN networking environment, the computer 102 is connected to the LAN through a network interface or adapter 162. When used in a WAN networking environment, the computer 102 typically includes a modem 164 or other means for establishing communications over the WAN, such as the Internet. The modem 164, which may be internal or external, may be connected to the system bus 108 via the user input interface 148, or other appropriate mechanism. In a networked environment, program modules depicted relative to the computer 102, or portions thereof, may be stored in the remote memory storage device. It will be appreciated that the network connections shown are exemplary and other means of establishing a communications link between the computers may be used.

In addition to the environment 100 shown in FIG. 2, the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Moreover, the present invention may be described in the general context of a software operating environment, e.g., computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
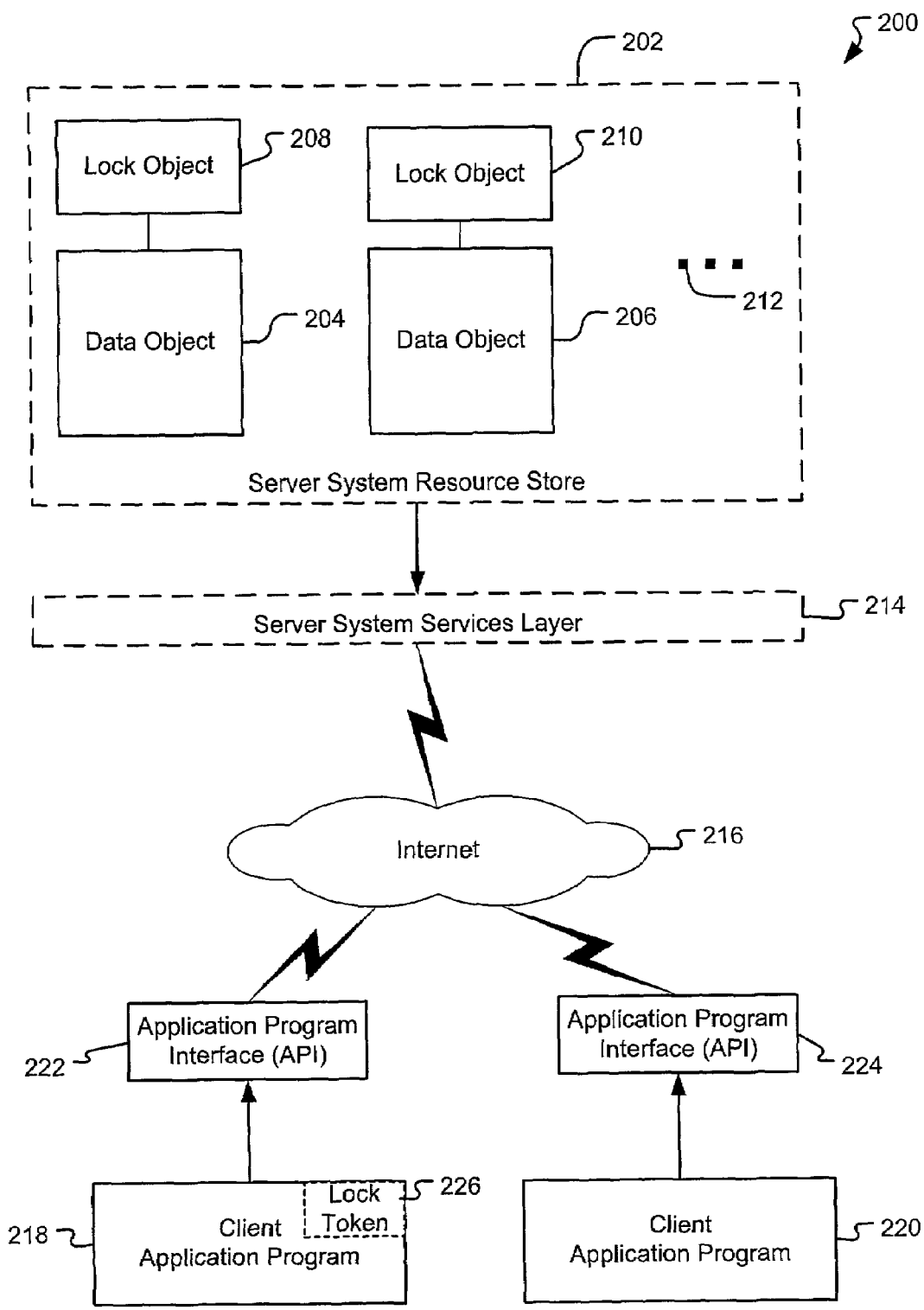
FIG. 3 is a block diagram illustrating software components of the present invention.

FIG. 3 illustrates an example of a software operating environment 200 in which the invention may be implemented. The software operating environment 200 is only one example of a suitable operating environment and is not intended to suggest any limitation as to the scope of use or functionality of the invention. Software environment 200 incorporates a Server System Resource Store 202 which defines the format and structure of data objects, such as data objects 204 and 206. Typically, the Server System Resource Store 202 also provides the overall structure in which objects are named, stored and organized. Additionally, the store provides the protocols for accessing any object within the store 202. In an embodiment, Store 202 is an XML store and has data objects defined by the XML standard. However, it is contemplated that other data object configurations or collections may incorporate the aspects of the present invention. Data objects 204 and 206 are data objects that represent actual file-type data. The objects 204 and 206 may be accessed and/or modified by a user or another program module. Of course, the Store 202 may comprise many other objects as indicated by ellipses 212.

Typically, each data object 204 and 206 has some form of meta information object (not shown) that is associated with each object, the meta information comprises information such as the author of the object, the time the object was last accessed, among others. This meta information may be stored as part of the data object or as part of another object having a pointer or some other identifying element that associates the meta information object with its particular data object.

In addition to the meta information objects, a data object may also be associated with a lock object, such as objects 208 and 210. Lock objects 208 and 210 are associated with data objects 204 and 206, respectively. Lock objects comprise information related to whether its associated data object is locked and therefore inaccessible by other client computer systems. Additionally, lock objects 204 and 206 may provide other functions, such as providing control over the types of locking methods, and/or the servicing of lock token requests. Although shown as separate objects, lock objects 204 and 206 may be incorporated into the data object itself as part of a header or some other meta-information portion of the data object.

Environment 200 also has a services layer 214, which relates to server functionality in servicing access requests for data objects 204 and 206. The services layer 214 may provide various functions, such as ensuring that an object access request complies with the existing protocol; whether the request relates to either an existing object or, in DAV, to an object that is to be created; whether the module making the request has permission to make and perform the request; among others. The services layer 214 also manages the availability of resources based on lock analysis as discussed in more detail below.

The services layer 214 receives requests over a distributed network environment, such as Internet 216. The requests are made by client computer applications, such as applications 218 and 220. In one embodiment, application program 218 is a client application program that operates on a client system apart from a server system, wherein the server system is the physical location of the Store 202. In other embodiments however, the application program, i.e., program 218 may actually be part of the server system. Applications 218 and 220 interact with the distributed network environment 216 through application program interfaces 222 and 224, respectively. The access requests may involve requests to move, copy, delete, read, execute or update a resource or object, such as object 204 or object 206.

With respect to the lock objects 208 and 210, in an embodiment of the invention, application programs 218 and 220 may cause the creation of lock objects 208 and 210 related to objects 204 and 206 respectively. Alternatively, the services layer 214 may create the lock objects, and associate the objects with the data objects. Once a lock object, e.g., lock object 208, has been created, another application may determine the existence of such a lock object and access the locked data object only in accordance with parameters set by the lock object, if at all.

In one particular example, the services layer 214 actually performs the creation and management of the lock objects 208 and 210. As described in more detail below, the services layer 214 receives a request from a client application program, such as application 218. The services layer then processes the request, i.e., determines whether the client application may access the data object in the requested manner. If the application is able to access the data object in the requested manner, the services layer returns a lock token 226 to the client application program 218 and allows the requested access. If the services layer 214 determines that the application program may not access the requested data object in the requested manner, such as to read, write, or delete the resource, access is denied.

To further this example, assume application program 220 attempts to access a data object that is locked by client application 218, as evidenced by the lock token 226. In such a case the application 220 cannot access that data object until client application 218 frees the lock token 226. However, as discussed in more detail below, depending on the type of lock created by client application 218, client application program 220 may still be able to access the locked data object to perform predetermined operations, such as to only read the data object, or to only delete the data object, etc.

The types of locks provided by the services layer, and used by the client application programs 218 and 220 may be either shared locks or exclusive locks. Exclusive locks do not allow any other clients or users to access the locked application for any reason, while shared locks allow other clients to access the application for limited purpose. As contemplated by the present invention, at least three new types of shared locks are added to the DAV protocol.

The first type of lock is referred to herein as a "write lock" wherein a write lock prevents any accesses to a resource for writing to the resource or deleting the resource. Another lock type is referred to herein as a "nosharewrite lock" wherein a nosharewrite lock prevents any accesses to a resource for writing to the resource. However, another client may still read the resource and delete the resource or properties of the resource.

Another type of lock, the "nosharedelete lock" allows other clients to read or write to an otherwise locked application, but does not allow any delete operations. Yet another lock, the "noshareread lock" prevents others from reading a resource.

In an embodiment of the invention, a "locktype" property is used, wherein the locktype property is an extension of the HTTP, as part of DAV. In essence, the locktype property is a new type of DAV property and has the same live/dead degree of freedom as other DAV properties, i.e., where a live property is managed at a server and dead property is managed at the client. Additionally, the different locktype values or types include the write lock, the nosharewrite lock, the nosharedelete lock and the noshareread lock, or a combination thereof. In order to define the new locktype property in DAV (and the lock types) the document type definitions (DTD) shown in Table 1 may be implemented. Of course these samples could also be written as schemas.

TABLE 1

Sample DTD Definitions For LockTypes:

1 Name:     locktype
  Namespace: DAV:
  Purpose:   Specifies the access type of a lock.
  <!ELEMENT locktype (write | nosharewrite | nosharedelete | noshareread)+>
2 Name:     write
  Namespace: DAV:
  Purpose:   Specifies a write lock.
  Description:  The lock conflicts with all updates, including both writes and deletes. It is equivalent to (nosharewrite, nosharedelete). An exclusive write lock will conflict with shared or exclusive write, nosharewrite, or nosharedelete locks.
  <!ELEMENT write EMPTY>
3 Name:     nosharewrite
  Namespace: DAV:
  Purpose:   Specifies a lock that conflicts with write operations.
  Description:  Holding this lock prevents others from adding new properties or updating existing properties of a resource. The lock conflicts with all write operations. This includes adding new TABLE 1-continued Sample DTD Definitions For LockTypes:

properties or resources and updating existing ones. It does not conflict with deleting properties or resources. An exclusive nosharewrite lock will conflict with a shared or exclusive write or nosharewrite lock.
<!ELEMENT nosharewrite EMPTY>
4  Name:       nosharedelete
   Namespace: DAV:
   Purpose:    Specifies a lock that conflicts with delete operations.
   Description:   Holding this lock prevents others from deleting a resource or its properties. The lock conflicts with all operations that delete resources or properties. An exclusive nosharedelete lock will conflict with a shared or exclusive write or nosharedelete lock.
<!ELEMENT nosharewrite EMPTY>
5  Name:       noshareread
   Namespace: DAV:
   Purpose:    Specifies a lock that conflicts with read operations.
   Description:   Holding this lock prevents others from reading a resource or its properties. Note that the use of this locktype will require read methods including GET and PROPFIND to use the conditional If format to specify the opaquelocktoken. The lock conflicts with all read operations. An exclusive noshareread lock will conflict with a shared or exclusive noshareread lock.
<!ELEMENT noshareread EMPTY>

As shown in Table 1, three new values are added to the locktype XML element defined in DAV. These values will enable the use of shared locking methods for write, read and delete. Additionally, these values will enable better support of applications written to other programming models or platforms that use similar sharing methods, such as the Win32® programming model.

In order to create or get one of these lock type values in connection with an object, a request is made that includes lock request information such that the lock request is coincident with the access request. Consequently, when a client system is requesting access to an object, or requesting to create and use an object, the client system includes requests for the type or types of locks to be created and enforced during its use of that data object. The server computer system determines whether to provide the lock type requested. Once a lock type is granted, the server computer system enforces the lock type against other access requests.

Figure 4:
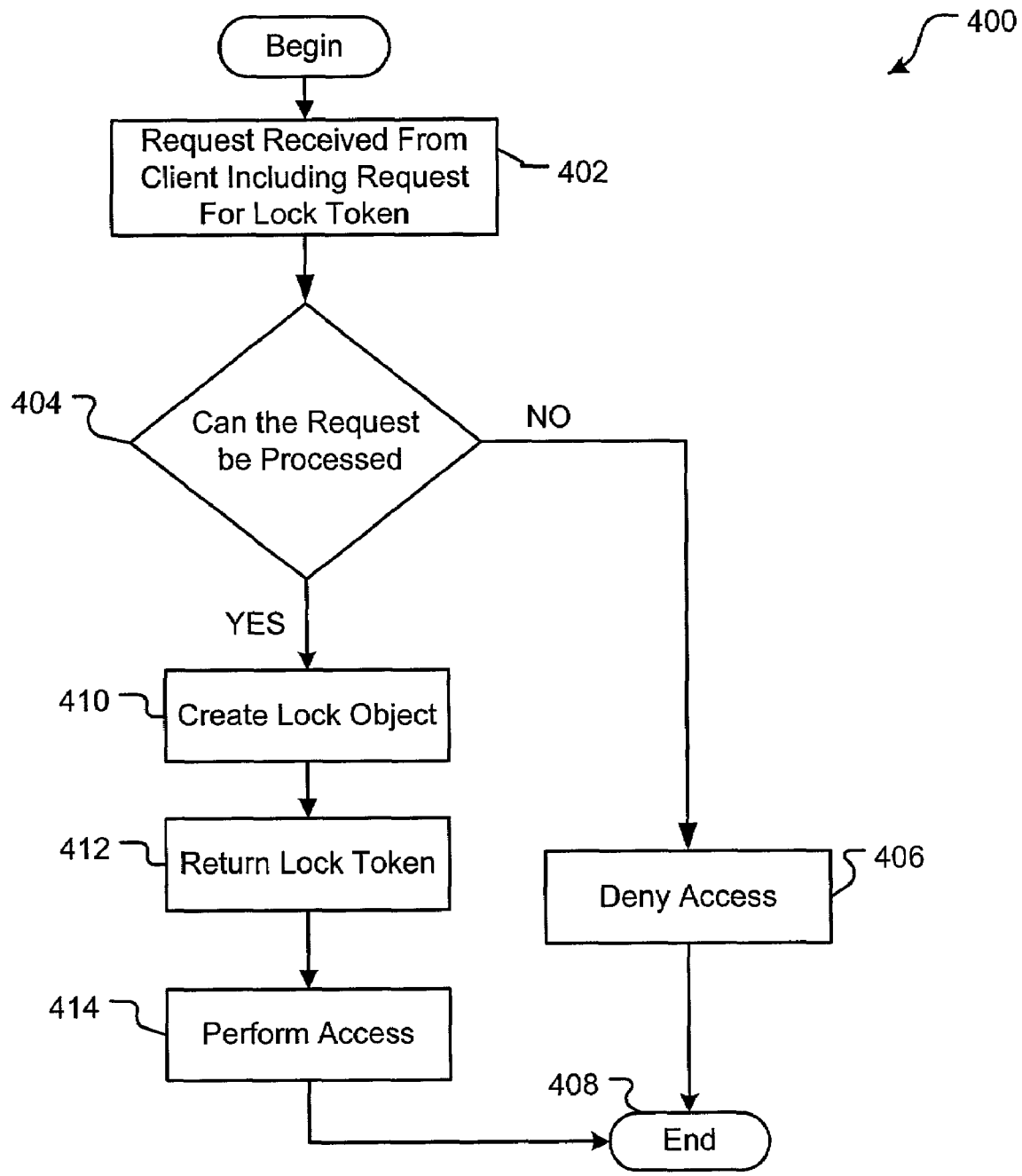
FIG. 4 is a flow diagram illustrating the functional components of accessing and locking a resource according to the present invention.

FIG. 4 is a flow chart of the operational characteristics related to accessing and locking an object according to aspects of the present invention. Prior to the beginning of flow 400 an object, such as object 204 and/or 206 shown in FIG. 3, may already exist within a Server System Resource Store, such as store 202. In such an embodiment, once the object has been created, then any later attempt to access that object initiates the flow 400 shown and described with respect to FIG. 4. In an alternative embodiment however, e.g., such as when the DAV protocol is used, the object may not exist prior to flow 400. In such a case, a lock object may be created in parallel with the creation of a data object, or the lock object may be created and later associated with the data object once the data object is created.

Process 400 generally begins with receive operation 402, wherein the receive operation 402 relates to the receipt, by the server system of any read, execution, or update access request related to an object. The access attempt may be performed by a third party application, such as application 218 or 220 (FIG. 3) or by the services layer 214, among others. The access request incorporates information related to the type of access that is being requested, i.e., to read, to write, to delete, etc. Additionally, the request information may also include information as to the type of lock to be created and applied while the object is in use. For example, the access request may be a write access request, meaning that the client application is requesting access to write to, or edit the resource or object. The request also includes lock information such as read-share lock request, meaning that others may read the resource while the client is writing to the resource. Moreover, the request information may also include a request for a lock token to be returned to the client application, as described below.

Following receipt operation 402, determination act 404 determines whether the access may be allowed. Determining whether or not an access may be allowed involves an evaluation of existing lock information for that resource. That is, the server must determine whether the resource is locked by another client application program. Determining whether the resource is locked, in an embodiment of the invention, involves requesting lock properties from the resource object itself. In such a case, the resource may be associated with a lock object, such as objects 208 and 210 (FIG. 3) and the lock objects may be evaluated to determine the type of lock, if any, presently being enforced for the requested resource. In other embodiments, the determination relates to an evaluation of a look-up table that is managed by the services layer 214. Yet other embodiments may incorporate other means of providing information related to whether an object is locked and, if so, the type of lock.

If determination act 402 determines that the requested resource may not be accessed, then access is denied at operation 406 and flow ends at end operation 408. In such a case, a message may be sent to the requesting client application for the purposes of informing the client that the access was denied and for what reason, e.g., that the object is locked by another client application. Additionally, the returned message may also indicate the type of lock that is presently being enforced for that object, in case the client wishes to attempt another type of access.

If determination act 404 determines that the requested resource may be accessed, flow branches YES to create lock operation 410. Create lock operation 410 performs the creation and/or association of a lock object or other lock-related data structure with the requested object. The type of lock object that is created relates to the type requested by the client application. The lock object generated by operation 410 may then be evaluated during other access requests until the lock object is removed or invalidated.

Following the creation of the lock operation 410, return token operation 412 returns a lock token to the client application that requested access to the object. Return token operation 412 essentially provides the client application information related to the newly created lock object. Additionally, in an embodiment of the invention, this lock token may also include specific, predetermined key information related to the lock object. The key information may then be used by the client application at a later time to gain access to the locked object.

Upon returning the lock token to the application, perform access operation 414 performs the requested access, i.e., the access requested at operation 402. The client application may then perform the type of access, e.g., read, write, execute, delete, etc. on the resource that has been requested. Following performance of the access, flow 400 ends at end operation 408.

In accordance with other aspects of the present invention, the DAV protocol is extended to incorporate "advisory locks." An advisory lock may or may not be honored by a client application 218 or 220 or the services layer 214. Instead, the requesting application may inquire as to the existence of an advisory lock and then determine whether to honor that lock.

The advisory status may be combined with any type of lock, such as the nosharewrite, noshareread and nosharedelete lock types described above.

In one embodiment the implementation of advisory locks relates to adding a new lock enforcement rule, e.g., by creating a "lockenforcementrule" property to the lockinfo XML element defined in DAV. The definitions of the lockinfo, lockentry, and activelock XML elements are extended to support this new lock property. The DTD definition of lockinfo and activelock are updated as well. The new DTD definitions are shown in Table 2.

TABLE 2

Sample DTD Definitions To Enable Advisory Locks:

```
1  Name:     lockentry
   Namespace: DAV:
   Purpose:   Defines the types of locks that can be used with the
              resource.
   <!ELEMENT lockentry (lockscope, locktype, lockenforcementrule?)>
2  Name:     lockenforcementrule
   Namespace: DAV:
   Purpose:  Specifies the whether the lock should prevent conflicting
             operations or not.
   Description: A mandatory enforcement rule will cause conflicting
             operations to be failed and an advisory enforcement rule will only fail
             conflicting LOCK or UPGRADELOCK operations.
             The default value is mandatory.
   <!ELEMENT lockenforcementrule (mandatory | advisory)>
3  Name:     mandatory
   Namespace: DAV:
   Purpose:  Specifies that operations that conflict with the lock should
             be failed.
   Description: The server should fail any operations
             that conflict with this
             lock. For example, a PROPPATCH command will be failed if the
             resource is nosharewrite or write locked
             and the caller does not own the
             lock.
   <!ELEMENT mandatory EMPTY>
4  Name:     advisory
   Namespace: DAV:
   Purpose:  Specifies that only LOCK and UPGRADELOCK
             operations that conflict with the lock should be failed. Other
             operations will be allowed to proceed.
   Description: The server should only fail LOCK and
             UPGRADELOCK operations that conflict with this lock. For
             example, a PROPPATCH command will be allowed to proceed if
             the resource is nosharewrite or write locked and the caller does not
             own the lock. However, an attempt to acquire an exclusive
             nosharedelete lock will fail if it is already held.
   <!ELEMENT advisory EMPTY>
```

Figure 5:
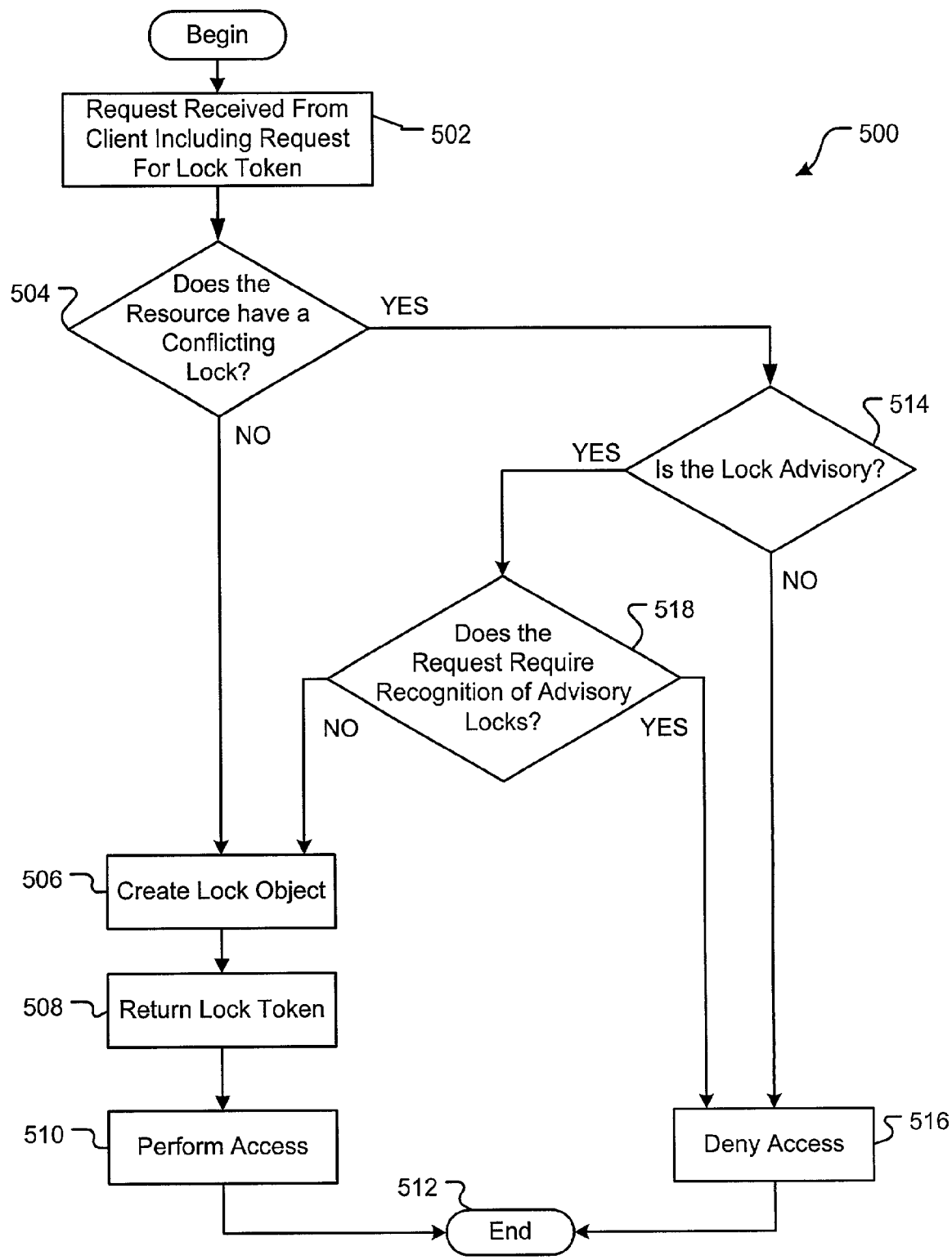
FIG. 5 is a flow diagram illustrating the functional components of accessing and locking a resource according to an alternative embodiment of the present invention.

FIG. 5 is a flow chart of the operational characteristics related to accessing an object according to aspects of the invention related to the use of advisory locks. As described above with respect to FIG. 4, prior to the beginning of flow 500 an object, such as object 204 and/or 206 shown in FIG. 3, exist within a Server System Resource Store, such as store 202. In this particular embodiment of the invention, once an object has been created, then any attempt to access that object initiates the flow 500 shown and described with respect to FIG. 5.

Flow 500 begins with receive operation 502, wherein the receive operation 502 relates to the receipt, by the server system of any read, execution, or update access request for an object. The access attempt may be performed by a third party application, such as application 218 or 220 (FIG. 3) or by the services layer 214, or by yet other client-type requesting entities. The request itself may include information as to the type of access sought, any lock types to be created and enforced during the access, a request for a lock token, etc. Additionally, in this particular case, the request may provide an indication whether advisory locks should be recognized, i.e., honored. In an embodiment of the invention, the request may explicitly indicate to not recognize advisory locks, or the request may simply provide no indication as to how advisory locks should be handled. In such a case, no indication relates to a request that advisory locks should not be recognized.

Once the request has been received, determination act 504 determines whether the requested resource is locked. Thus, determination act 504 determines whether the resource is locked by another client application program by either searching for a lock object associated with the resource, analyzing properties of the resource object itself, or by searching for lock information in a look-up table type of data structure. In either situation, the server analyzes any lock information for the requested object and determines whether an associated lock conflicts with the type of access requested.

If determination act 504 determines that the type of request does not conflict with any lock objects associated with the requested object, flow 500 branches NO to create lock object operation 506. Create lock object operation 506 creates a lock object and associates the lock object with the requested resource. Operation 506 is similar in function to create lock object operation 410 described above in conjunction with FIG. 4. Following creation of lock object operation 506, return token operation 508 returns a lock token to the client application that requested access to the object. Return token operation 508 is similar to return lock token operation 412 described above in conjunction with FIG. 4.

In alternative embodiments, the request received at operation 502 does not request that a new lock be created and in such a case, operations 506 and 508 may be omitted. Additionally, in other embodiments, a lock token is not requested and therefore operation 508 is omitted.

Once it has been determined that no conflicting locks are associated with the requested resource, and any requested locks have been created, then perform access operation 510 performs the requested access. Upon performance of the requested access, flow 500 ends at end operation 512.

If determination act 502 determines there is a lock associated with the requested resource that conflicts with the requested access, then flow 500 branches YES to test act 514. Test act 514 tests the lock to determine whether the lock is an advisory lock or whether the lock is mandatory. Testing whether the object is advisory relates to checking the property named lockenforcementrule. If this property is set to mandatory, then flow branches NO to deny access operation 516, which denies access to the requested resource and flow 500 ends at operation 512.

However, if lockenforcementrule property is set to advisory, then flow 500 branches YES to request evaluation act 518. Request evaluation act 518 evaluates the request received at operation 502 to determine whether the request provides an indication as to whether the advisory lock should be recognized. That is, in this embodiment, the initial access request incorporates a flag or some other data that indicates that advisory locks should be recognized and therefore preventing access to the requested resource. A request may be from a certain type of application, such as a UNIX application and that, by itself, may provide the indication that advisory locks should be recognized. Still other means may be employed to provide the necessary information to the server indicating whether to honor the advisory lock or to ignore the advisory lock. In an alternative embodiment, the server sends a query to the requesting application to determine whether the advisory lock should be honored.

If request evaluation act 518 determines that the advisory lock should be recognized, then flow branches YES to deny access operation 516. Deny access operation 516 effectively denies the access request, and may also send a notice informing the client of the nature of the lock and the reason for the denial of access.

On the other hand, if the request evaluation act 518 determines that the advisory lock should not be recognized, then flow branches NO to create operation 506. As discussed above, create operation creates a lock object, if one is requested as long as it does not conflict with the existing lock. Following creation of the lock object, return lock token 508 returns a lock token to the application, and then perform access operation 510 performs the requested access.

In an embodiment of the invention, however, the advisory locks are honored for particular types of requests, even if the request does not specify that advisory locks should be honored. For example, requests for exclusive locks are denied based on the fact that the object is in use by another client and an exclusive lock may not be given under those circumstances. Similarly, requests to upgrade or modify the lock type even though an advisory lock is used since the upgrade may be inconsistent with the existing lock scheme.

The above described system and method provides a significant advantage over prior methods of managing resource locks in a distributed environment. In particular, the use of shared locks modes and advisory lock types advance the locking schemes and enables compatibility with existing, non-DAV related applications.

As discussed above, the invention described herein may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Additionally, although the invention has been described in language specific to structural features and/or methodological steps, it is to be understood that the invention defined in the appended claims is not necessarily limited to the specific features or steps described. Therefore, the specific features and steps are disclosed as preferred forms of implementing the claimed invention.

What is claimed is:

1. A method of locking a resource in a distributed environment communicating in a Distributed Authoring and Versioning (DAV) protocol, wherein the DAV protocol is an extension of Hypertext Markup Language (HTTP), the method comprising:
    receiving a request in the DAV protocol to access the resource, wherein the request originates from a requesting client computer system;
    in response to the request, creating a lock having a predetermined type, wherein the predetermined type is one or more of the following: nosharewrite, noshareread, and nosharedelete;
    returning a lock token upon the creation of the lock to the requesting client computer system; and
    performing the requested access.

2. A method as defined in claim 1 wherein the request to access the resource provides an indication as to the type of access and to the type of lock to be created during the access, said method further comprising:
    prior to the act of creating a lock, determining whether the resource is locked by another client computer system; and wherein
    the act of creating a lock only occurs if no existing lock conflicts with the type of access requested or the type of lock requested.

3. A method as defined in claim 1 wherein more than one client computer system can lock the resource.

4. A method as defined in claim 1 wherein the requesting client computer system requests the type of lock to be created and a server computer system creates and maintains the lock.

5. A method as defined in claim 1 wherein the lock is advisory.

6. A computer storage medium storing instructions for executing the method recited in claim 1.

7. A method of maintaining an advisory lock on a resource in a distributed environment communicating in a Distributed Authoring and Versioning (DAV) protocol, wherein the DAV protocol is an extension of Hypertext Markup Language (HTTP), the method comprising:
    receiving an access request in the DAV protocol for the resource from a requesting client computer system;
    determining whether the resource is locked with an advisory lock by another computer system;
    if the resource is locked by another computer system with a conflicting advisory lock then denying access if the requesting client computer system honors advisory locks; and
    if the requesting client computer system does not honor the advisory lock or if the resource is not locked with a conflicting lock, then creating a lock, returning a lock token upon creation of the lock, and performing the access.

8. A computer storage medium storing instructions for executing the mehod recited in claim 7.

9. The method of claim 7, wherein creating the lock further comprises creating the lock with a nosharedelete property.

10. The method of claim 7, wherein creating the lock further comprises creating the lock with a noshareread property.

11. The method of claim 7, wherein creating the lock further comprises creating the lock with a nosharewrite property.

12. The method of claim 7, wherein determining whether the resource is locked by another computer system further comprises determining whether the resource is locked with a property in accord with a lock type associated with the access request.

* * * * *